H. A. W. WOOD.
GRAVITY SHAVING AND COOLING MACHINE FOR STEREOTYPE PLATES.
APPLICATION FILED AUG. 9, 1906. RENEWED AUG. 7, 1918.
1,281,116.
Patented Oct. 8, 1918.
7 SHEETS—SHEET 4.
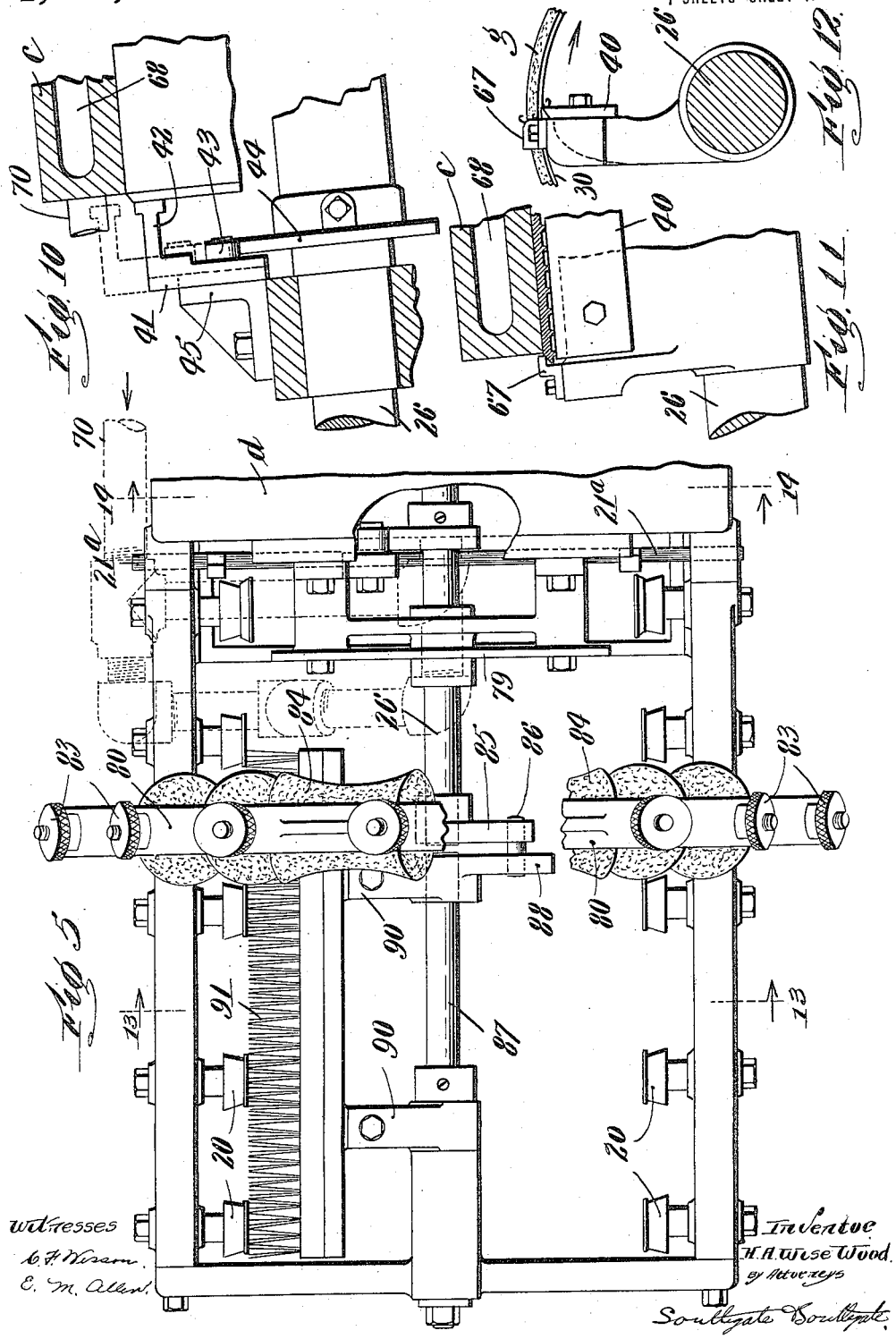

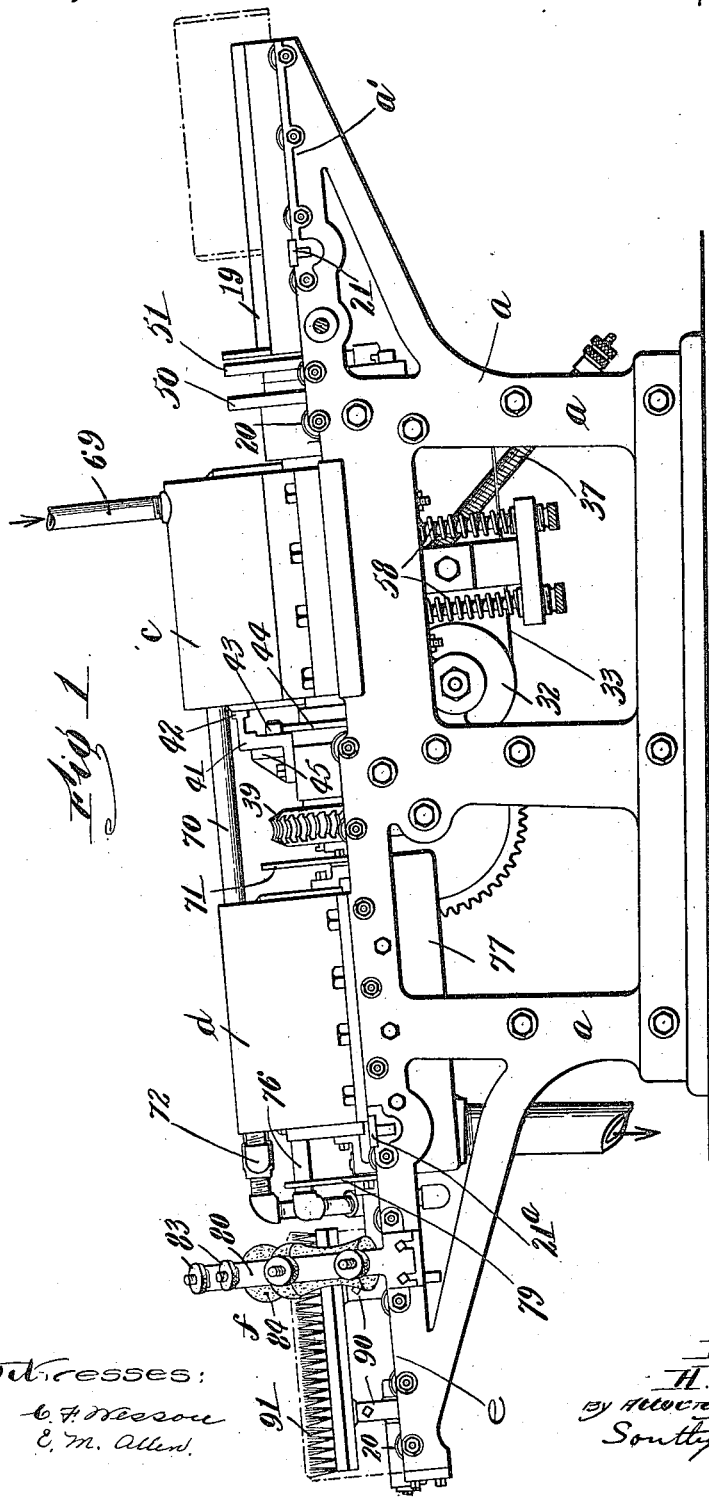

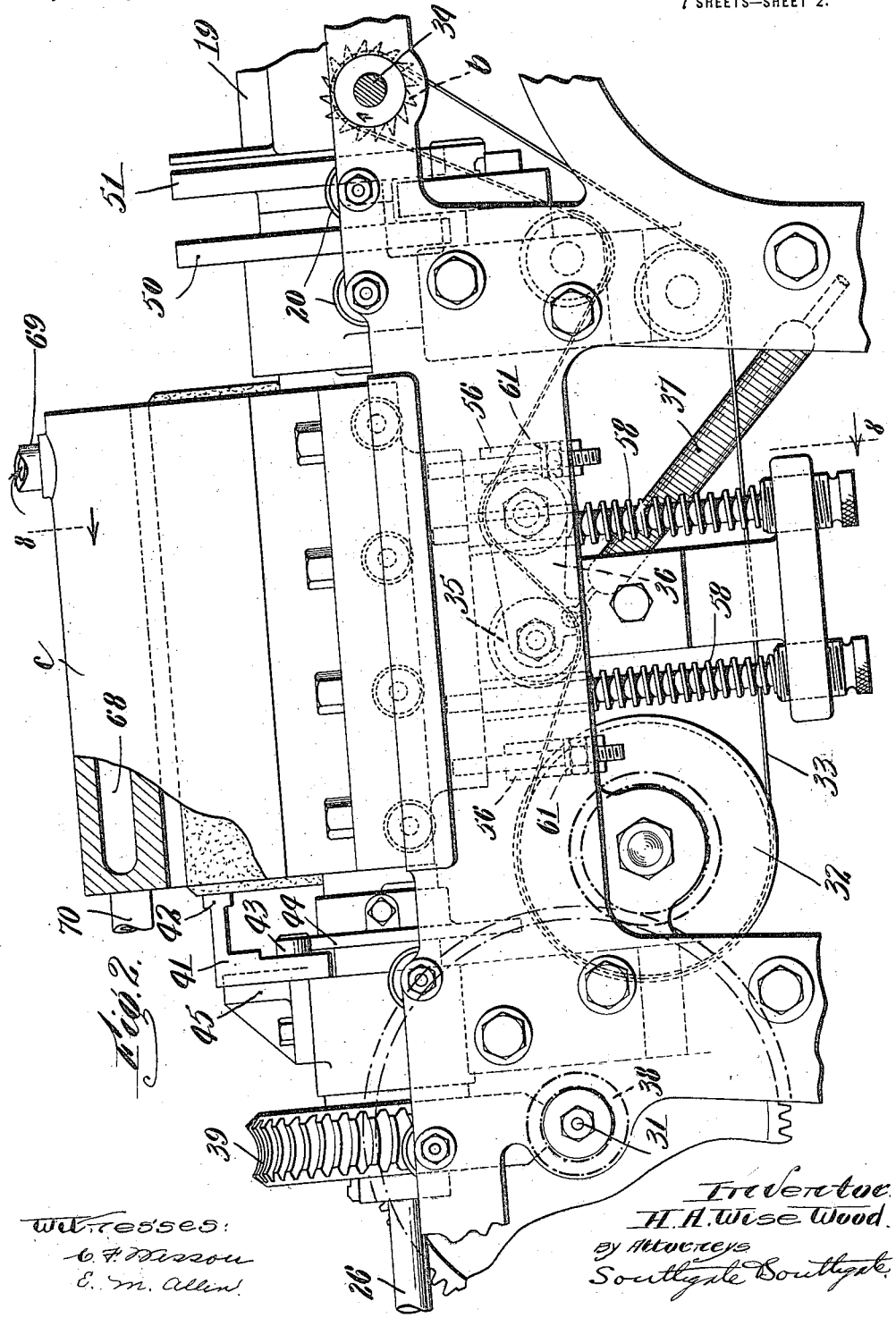

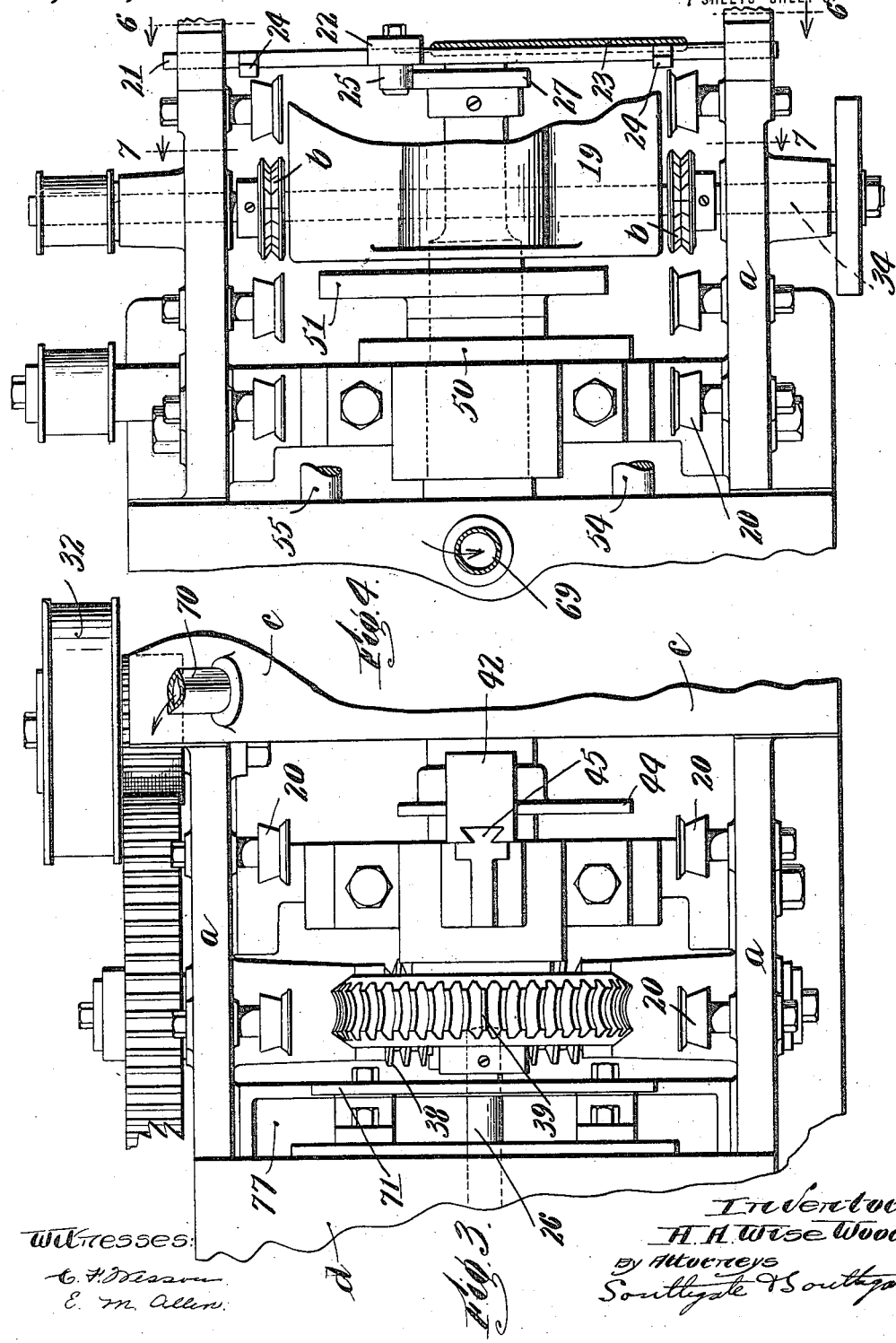

H. A. W. WOOD.
GRAVITY SHAVING AND COOLING MACHINE FOR STEREOTYPE PLATES.
APPLICATION FILED AUG. 9, 1906. RENEWED AUG. 7, 1918.
1,281,116.
Patented Oct. 8, 1918.
7 SHEETS—SHEET 5.
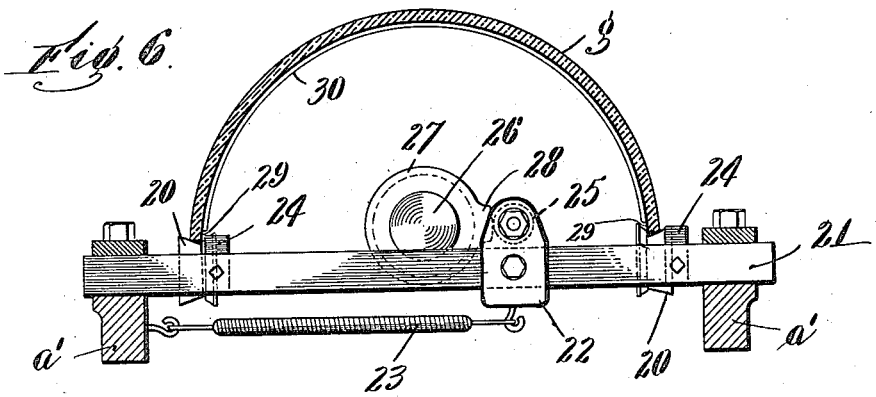
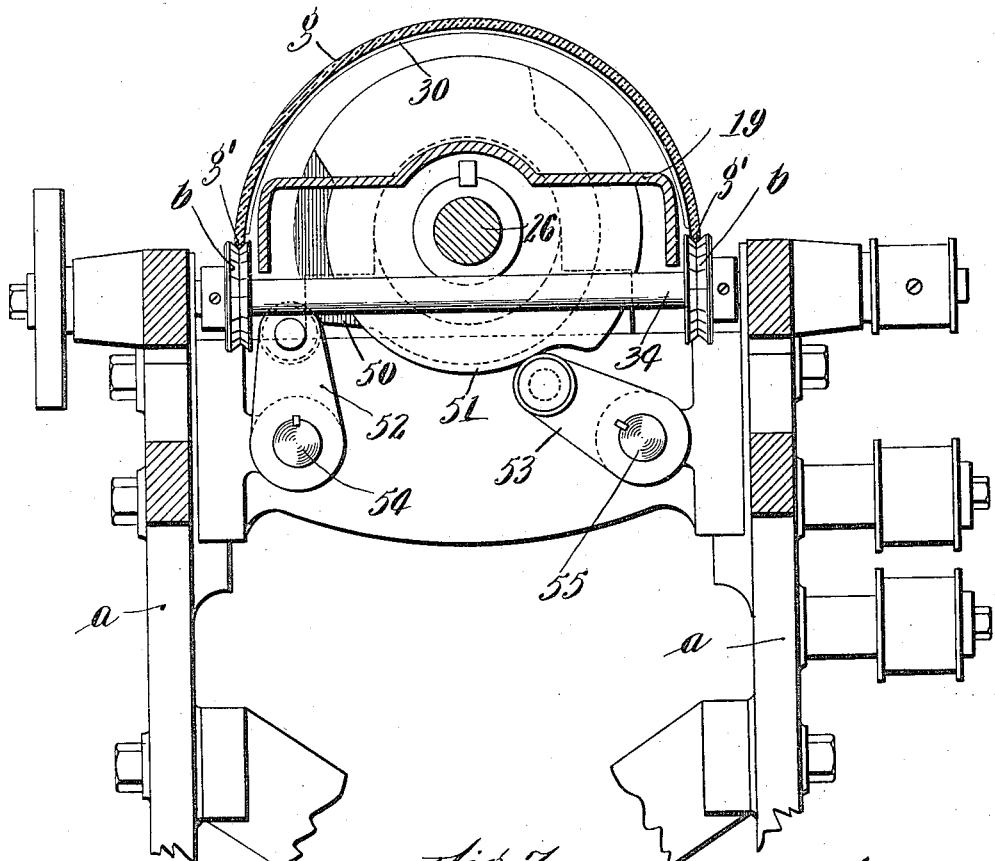

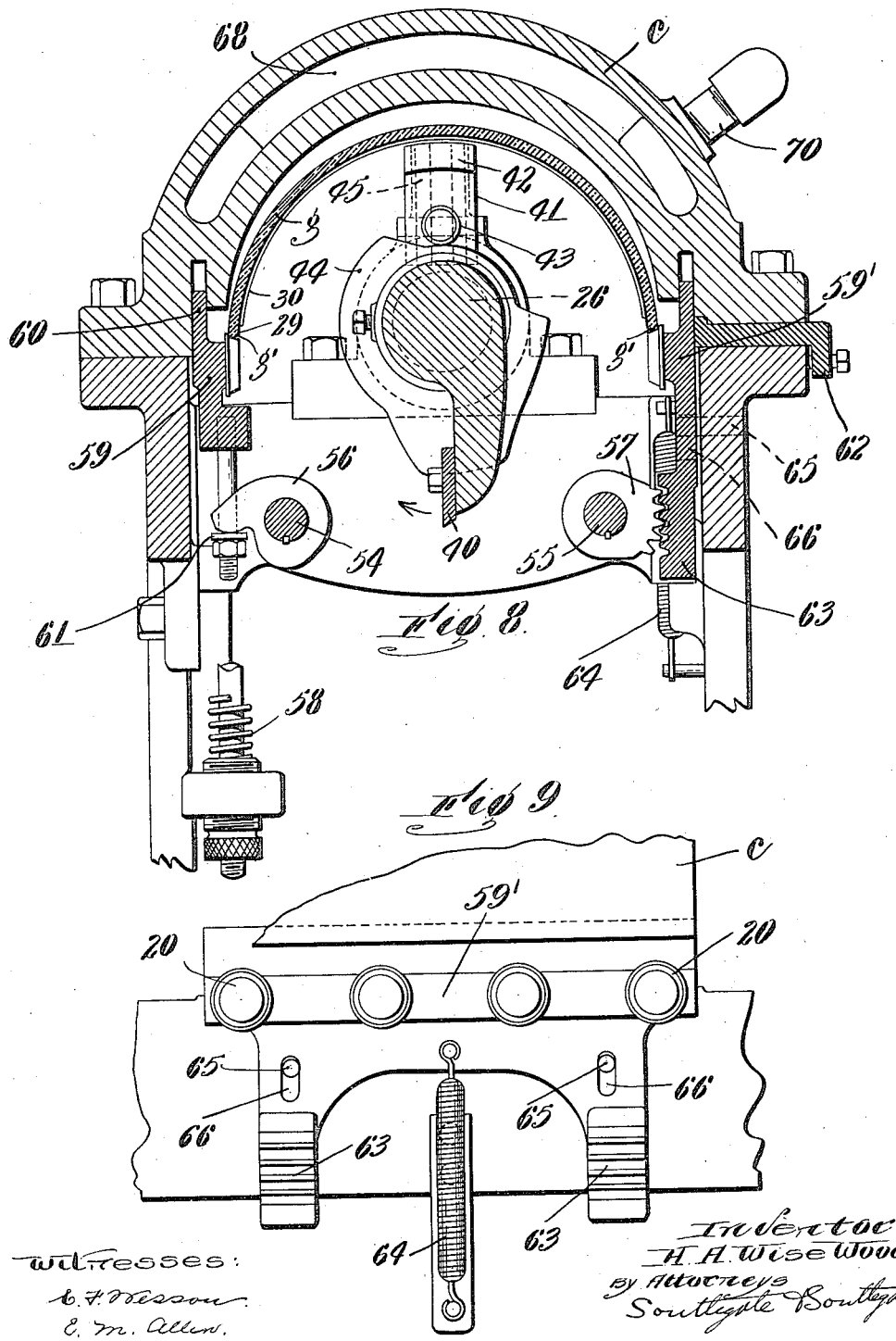

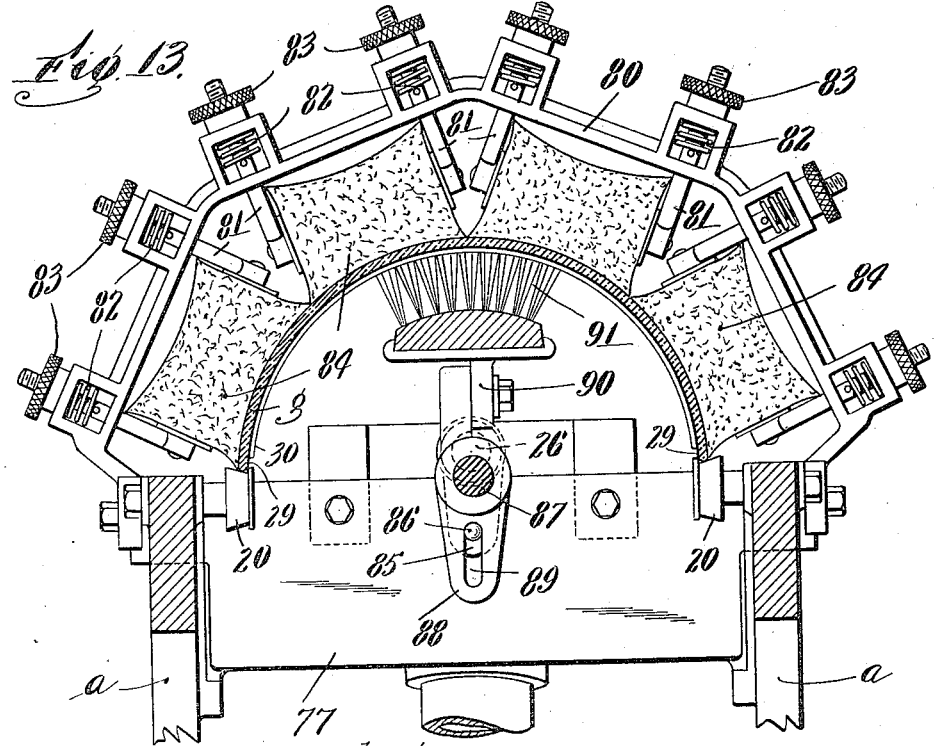
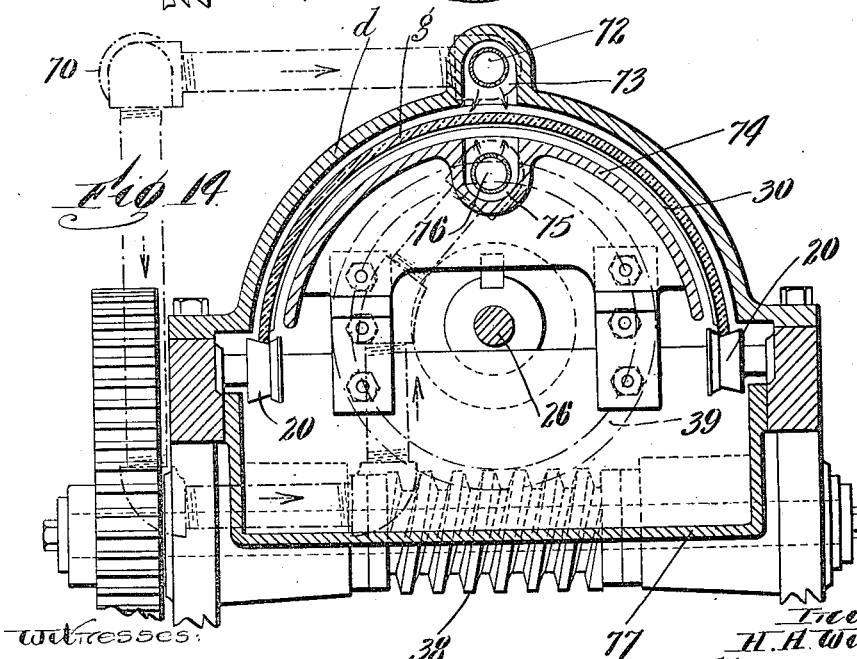

UNITED STATES PATENT OFFICE.

HENRY A. WISE WOOD, OF NEW YORK, N. Y., ASSIGNOR, BY MESNE ASSIGNMENTS, TO WOOD NEWSPAPER MACHINERY CORPORATION, OF NEW YORK, N. Y., A CORPORATION OF VIRGINIA.

GRAVITY SHAVING AND COOLING MACHINE FOR STEREOTYPE-PLATES.

1,281,116.     Specification of Letters Patent.     Patented Oct. 8, 1918.

Application filed August 9, 1906, Serial No. 329,833. Renewed August 7, 1918. Serial No. 248,803.

*To all whom it may concern:*

Be it known that I, HENRY A. WISE WOOD, a citizen of the United States, residing at New York, in the county of New York and State of New York, have invented a new and useful Gravity Shaving and Cooling Machine for Stereotype-Plates, of which the following is a specification.

My invention relates to improvements in machines for finishing, cooling and drying stereotype plates in which the latter are fed partially or wholly by gravity down an inclined plane while various finishing and cooling operations are performed.

In a previous application for patent on a "machine for finishing and cooling stereotype plates," filed April 6, 1906, Serial No. 310,343, I have described an invention on which this is an improvement.

The principal objects of this improvement are to provide improved and simplified means for automatically stopping the plate at the various points at which operations are to be performed; to provide means for commencing the cooling operation at an earlier period and carrying it on continuously; to provide more efficient means for rapidly cooling the plate; to provide for removing the free water from both the inside and outside of the plate in such a manner as to leave the printing surface in a condition sufficiently dry for immediate attachment to the press; to provide guides for preventing the plate from getting out of proper line in the machine; to improve the edge trimming mechanism; and to generally improve and simplify the construction of machines of this type.

It is to be understood that while I have illustrated and described an embodiment of the invention in which it is employed for use upon stereotype plates and while that is the principal use to which I at present contemplate putting it, yet the principles involved are applicable for operation upon other kinds of castings and articles which have to be finished, cooled or dried.

Reference is to be had to the accompanying seven sheets of drawings in which,

Figure 1 is a side elevation of a machine illustrating one embodiment of my invention.

Fig. 2 is a side elevation of a portion of the same on an enlarged scale, parts appearing in section.

Figs. 3, 4 and 5 are fragmentary plans of portions of the same.

Fig. 6 is a sectional view on the line 6—6 of Fig. 4.

Fig. 7 is a sectional view on the line 7—7 of Fig. 4.

Fig. 8 is a sectional view on the line 8—8 of Fig. 2

Fig. 9 is an internal side elevation of parts appearing in Fig. 8.

Fig. 10 is a longitudinal sectional view through the bearings of the cutter shaft of certain features shown in Fig. 2.

Fig. 11 is a fragmentary elevation of the shaver or cutter, the stereotype plate and arch for holding the same appearing in section.

Fig. 12 is an end elevation of the same.

Fig. 13 is a sectional view on the line 13—13 of Fig. 5, and,

Fig. 14 is a sectional view on the line 14—14 of Fig. 5.

In a machine of this type, a frame $a$ is provided having an inclined body or runway $a'$ for carrying stereotype plates or the like. The machine is intended to be used chiefly in conjunction with a plurality of casting boxes, the plates provided thereby being placed by hand or otherwise on the upper end of the runway $a'$; these plates then move by gravity down the runway to finishing mechanism by which their edges are first finished by cutters $b$, shown in Fig. 2. They then enter an arch $c$ in which their interior surfaces are shaved. From this point they pass to a cooler $d$ and from that they may move out on a table $e$ from which they are removed by hand or otherwise.

It is to be observed that on account of the incline of the runway and on account of the fact that it is provided with anti-friction devices shown in the form of a series of rollers 20, no positive feeding mechanism and no driving device for feeding the plates or other blanks is necessary. The incline of the bed is such that the plates are readily fed down by gravity when they rest freely on the rollers.

The mechanism so far described, is shown broadly in the application referred to above.

In the present case, in addition to the general features indicated by the reference letters, the machine is provided with a drying device $f$ adapted to remove the free water from the surfaces of the plate after it passes through the cooler and in addition to this, the arch c, in which the shaving is performed, is provided with means for preliminarily cooling the plates while they are being shaved.

These features and the other principles which I have employed for the purpose of improving the type of gravity shaving machine represented in the above mentioned application, will now be described by reference to the construction which is illustrated in the drawings. At the upper end of the table a' is located a guide or guard 19 to aid the operator in placing the plates on the rollers 20. It is high enough as shown in Fig. 7 to insure the proper placing of the plates on the rollers.

Means is also provided for intercepting a plate placed on the table a' and holding it in a stationary position until the plate in advance thereof has passed out of the arch c. For this purpose a sliding bar or gate 21, shown in Fig. 6, is arranged across the table a'. On this gate is a block 22 which is connected by a spring or other resilient device 23 with one side of the frame for the purpose of normally pulling the bar into such position that stops 24 thereon will move in front of the adjacent rollers 20 and into the path of the edges of the plate. This being the normal position of the stops, it is necessary to provide means for moving the stops either to the right or left in order to permit the plate to pass.

For this purpose, the block 22 is provided with a roller 25, and a longitudinal shaft 26 on the machine which is ordinarily intended to operate continuously, is provided with a cam 27 having a projection 28 for engaging the roller 25 periodically and for moving the slides and stops into such position as to permit the plate to pass by the stopping mechanism by the force of gravity.

Although the machine is capable of operating upon the ordinary curved plates, I prefer to use it with a special plate so constructed as to coöperate with the machine in certain respects. For this purpose I have shown a plate g having a smooth surface 29 along the inner longitudinal edges caused by stopping off the circumferential ribs 30 at a short distance from these edges. This serves two purposes; first it permits the plates to be guided by the grooved rollers 20 without injuring the outer or type surface; and second it allows the operation of the gate 21 to prevent the entrance of a plate g out of time. The cam of the gate has but an instant's rise for opening it so that the front end of the plate is just let by the gate, which immediately thereafter is drawn against the inner surface of the edge of the plate on one side by its spring; so immediately the plate passes the gate the latter snaps closed behind it, in other words, this arrangement enables me to open the first gate only at the correct moment and then for the correct instant only so that no plate put in late may get half out of time. The gate is opened for an instant and if no plate is there closes, but if a plate has been in position and starts to pass on, the gate is held open by coming against the smooth inner edge of one side of the plate, and when the plate passes it, it snaps closed behind it. It is to be noticed also that the right hand gate of Fig. 6 is clear of the plate (type) surface while the left side gate is bearing against the inner side of the plate. This prevents rubbing of the type.

After this, the plate moves over the two double edge trimming saws b. These saws are driven from a main shaft 31 through gearing by a pulley 32 which is provided with a belt 33 engaging a pulley on a shaft 34 on which the cutters are mounted. This belt passes over idlers and one of these idlers 35 is mounted on a pivoted frame 36 which is provided with a spring 37 for normally keeping the pulley in such position as to tighten the belt at all times. The saws trim the plate on its outer edge and also cut off the sharp inner edge which is usually left on a plate. The plate is thus left with double beveled longitudinal edges g'.

The main shaft 31 also carries a worm 38 which operates a worm-wheel 39 on the shaft 26, which has been referred to above. Also arranged on this shaft is a shaving blade 40 located in the arch c.

The plate descends along the inclined table into this arch and is stopped in proper position therein by means of mechanism operated from the shaft 26.

I have shown this mechanism as being in the form of a slide 41 having a stop 42 thereon for engaging the edge of the plate and provided with a roller 43 adapted to engage a cam 44 on the shaft 26.

The operation of the cam causes the slide to move up and down on ways 45 so as to engage the end of the plate and hold it in proper position in the arch for the shaving operation to take place.

The frame a is provided with a resilient supporting device for assisting in seating the plate in the arch and holding it in position therein. It is to be noted that on the shaft 26, preferably in the position in front of the arch c, are a pair of cams 50 and 51. These cams operate rollers on cranks 52 and 53 mounted on longitudinal shafts 54 and 55 respectively. One of these shafts carries cams 56 and the other segmental gears 57. Springs 58 properly guided are provided for normally forcing upwardly a movable support 59 carrying certain of the rollers 20. This support is provided with a guide 60 operating in a slot in the arch and from it is supported a plate 61 upon which the cam 56 is adapted to operate. On the opposite side of the arch a second support 59' is provided similar to the one described above. The arch c is provided with an adjustable plate 62 for adjusting purposes.

The frame has racks 63, with which the segmental gears 57 engage for the purpose of giving positive motion to this support. A spring 64 is employed for yieldingly drawing this support down. The motion of this support is guided by means of stationary pins 65 working in slots 66 in the support.

When a plate first enters the arch, the supports 59 are held down, one positively by the cam 56 and the other yieldingly by the spring 64. After the plate reaches the stop 42, the cams on the shafts 54 and 55 are operated to oscillate the shafts so as to force the support on the right hand side of Fig. 8, upwardly in a positive manner and to permit the other support to be forced yieldingly in an upward direction by the springs 58. This seats the plate in the arch in a yielding manner and holds it during the shaving operation.

By reference to Figs. 10, 11, and 12, it will be observed that the shaving blade is accompanied by an end trimming blade which would ordinarily interfere with the stop 42. It is for this reason that the stop is moved upwardly to the position shown in dotted lines in Fig. 10, during the rotary motion of the shaving blade. The stop is not needed at this time for the reason that the plate is held in the arch by the supports 59 and 59'.

As soon as the end trimming blade 67 moves past the stop, the latter drops down into proper position for holding the plate after the clamping device is withdrawn.

After the shaving and trimming operation is completed, the stereotype plate is released from the arch and the stop 42 moved downwardly so that the plate can pass over it.

While the plate is in the arch c, it is intended to be cooled simultaneously with the shaving operation. For this purpose the arch is hollow or has a channel 68, as shown in Figs. 2 to 8, this being provided with a supply pipe 69 at one end and a discharge pipe 70 at the other.

When the plate reaches the proper position in the arch d, it is stopped by a gate 21ª similar in all respects to the gate 21 and operating in the same way. A shield 71 is provided to prevent spattering of water from the cooler on the machine.

In the upper part of the arch d is a pipe 72 which preferably receives water from the pipe 70 and which is provided with perforations for directing the water onto the top of the stereotype plate while the latter is in the arch. In order to provide conveniently for this pipe, the arch has a channel 73 in the upper part thereof in which the pipe is located. Lower down in the arch is a plate 74 of a shape similar to that of the stereotype plate and located in such position that the plate passes over it. This plate 74 also has a cavity 75 in which is located a pipe 76 having perforations for directing the water therefrom against the under side of the stereotype plate. The pipe 76 receives water from the pipe 72. It will be seen that the water forced against the plate on both sides will run down the same into a trough 77 located below. A second splash guard 79 is located below the arch d. When the cooling operation is completed, the cam for operating the stop 21ª moves into such position that the gate is withdrawn and the plate is allowed to feed along by gravity into the drying device.

This drying device comprises a frame 80 having a series of adjustable bearings 81 supported by springs 82 and adjusted by thumb nuts 83. Each pair of bearings supports a roller 84 covered by absorbent gauze or other absorbent material. These rollers are of such a longitudinal cross-section that their outer surfaces form the arc of a circle of the same radius as that of the stereotype plate and their edges meet so that the entire surface of the plate is operated upon by the rollers to remove the free water therefrom, which otherwise would damage the inking rollers of the press.

The frame 80 is movably mounted on the main frame a so that the whole device can be quickly removed bodily for the purpose of replacing the rollers with dry ones to insure nearly perfect action.

For the purpose of brushing the moisture and incidental metal shavings from the interior of the plate, the shaft 26 is provided with an arm 85 having a pin 86 which rotates with it. On a shaft 87 placed somewhat eccentric with respect to shaft 26 is an arm 88 having a slot 89 in which the pin 86 operates. Adjustably mounted with respect to the arm 88 is a frame 90 carrying a brush 91, extending the length of the stereotype plate adapted to be turned by the rotation of the shaft 26 so as to clean and dry the interior surfaces of the plates. As a plate passes under the outside drying device, it moves to a position above the table over the drying and cleaning brush and can be removed therefrom by hand or forced from position over the brush by the descent of the next plate from above or by gravity.

By the employment of the principles illustrated above, whether in the form shown or in any other form embodying those principles, it will be seen that the stereotype plates are fed along the machine in a most effective and inexpensive manner by gravity; that the shaft 26 is provided with means for stopping the plates at the desired times and then allowing them to move on and with means for clamping the plates in the arch *c* and for holding them while being trimmed therein. Also that the plates are then cooled in a most effective manner by direct contact with water and are finally wiped and dried both on the inside and on the outside, and that the machine is improved and simplified in many particulars. The cooling and drying device and the printing plate disclosed herein are not claimed by themselves in this case as they constitute the subject matter of my divisional Patents, Nos. 1,150,475 and 1,150,474 both granted Aug. 17, 1915.

While I have shown and described a particular form in which I at present prefer to embody my invention, I am aware that many changes may be made therein by any person skilled in the art without departing from the principles of my invention or from the scope thereof as expressed in the claims. Therefore, I do not wish to be limited to the particular mechanism illustrated and described, but what I do claim and desire to secure by Letters-Patent is:

1. In a machine for finishing cast plates, the combination of means for supporting the lower edges of the plates and feeding them end-wise by gravity, comprising an inclined table, a shaver, and means above the upper end of the shaver for arresting the plates before they move into position to be operated upon by the shaver.

2. In a machine for finishing cast plates, the combination of means for supporting the lower edges of the plates and feeding them endwise, a shaver, and means adjacent to the end of the shaver and operatively connected therewith for stopping the plates.

3. In a machine for finishing cast plates, the combination of means for supporting the lower edges of the plates and feeding them endwise, a shaver, and means for stopping the plates, said means comprising a reciprocable bar having stops thereon for engaging the edges of the plate, and means for reciprocating the bar.

4. In a machine for finishing cast plates, the combination of means for supporting the lower edges of the plates and feeding them endwise, a shaver, and means for stopping the plates, said means comprising a movable bar having stops, a roller connected with said bar, a cam for operating said roller, and resilient means for resisting the operation of the cam.

5. In a machine for finishing cast plates, the combination of a feed device, a shaver, a shaft on which said shaver is mounted, a cam on said shaft, a movable bar having a roller for engagement with said cam, and stop devices connecting with said bar for arresting the motion of a cast plate.

6. In a plate finishing machine, the combination of means for supporting the lower edges of the plates and feeding them endwise, a stop adapted to engage a plate and positive means for moving the stop out of the way of the plates.

7. A finishing machine for curved stereotype printing plates comprising means for supporting the lower edges of the plates and feeding them forward endwise, a stop device having two stops, and means for moving the stops across the paths of the two straight edges of the plates, said stops being located farther apart transverse to the direction of feed than the front and rear edges of a plate to be operated upon.

8. A finishing machine for curved stereotype plates comprising a feed device for the plates and a movable stop device movable across the path of movement of the plates and having two stops one adapted to engage an inner side of the plate and the other so located as to be free from the outer surface of the opposite side of the plate at the same time.

9. A finishing machine for curved stereotype plates comprising a feed device for the plates and a movable stop device having two stops, one adapted to engage an inner side of the plate and the other so located as to be free from the outer surface of the opposite side of the plate at the same time, resilient means for moving both stops into the path of the edges of the plates and positive means for moving them out of the path of the edges of the plates.

10. In a machine for finishing cast plates, the combination of gravity feed for the plates having means at each side for supporting one edge of the plates, a finishing mechanism, a shaft for operating the finishing mechanism, a guard above the shaft between said means, for guiding the cast plates into proper position, a cam on said shaft, and a stopping device for the plates operable by said cam and located between said guard and the upper end of the gravity feed.

11. In a machine for finishing cast plates, the combination of a feed device for the plates having means at each side for supporting one edge of the plates, a finishing mechanism, a shaft for operating the finishing mechanism, and a guide above the shaft between said means, for guiding the cast plates into proper position on the feed device.

12. In a machine for finishing cast plates, the combination of a gravity feed device comprising two lines of rollers, and a guard under the path of the plates and between the two lines of rollers for guiding them into proper position on the feed device.

13. In a machine for finishing cast plates, the combination of means for supporting the lower edges of the plates and feeding them endwise by gravity comprising an inclined table, a shaver, means above the upper end of the shaver for arresting the plates before they move into position to be operated upon by the shaver, and means located between the arresting means and the shaver for trimming the edges of the plates.

14. In a machine for finishing curved stereotype plates, the combination with means for shaving the interior of the plates, of means for double beveling the longitudinal edges of the plates.

15. In a machine for finishing cast plates, the combination of a gravity feed device, a movable stop located in the path of the plates, a shaver, a shaft on which the shaver is mounted having means for controlling said stop, an arch in which the shaver operates, and a preliminary cooling device in said arch.

16. The combination with a stereotype plate finishing device, having means for preliminarily cooling the plates out of contact with the cooling fluid and for finishing them, of means for thereafter applying a cooling fluid to the plates, and means for feeding plates to the finishing device.

17. The combination with a stereotype plate finishing device, having means for preliminarily cooling the plates out of contact with the cooling fluid and for finishing them, of means for thereafter applying a cooling fluid to the plates, means for feeding plates to the cooling device, and means for removing the plates therefrom.

18. In a machine for finishing cast plates, the combination of an arch, a finishing mechanism mounted therein, means for cooling the cast plates while being finished, and means for subsequently completing the cooling of the plates.

19. In a plate finishing machine, the combination of an arch for receiving the plates, a pair of supports for the plates, means for yieldingly forcing one of said supports toward the arch, means for yieldingly forcing the other away from the arch, and means for positively moving said supports in the opposite direction to the motion produced by said yielding means.

20. In a plate finishing machine, the combination of an arch for receiving plates, a support in the arch, means for withdrawing said support from the arch yieldingly, and means for forcing it toward the arch positively.

21. In a plate finishing machine, the combination of an arch for receiving plates, a support in the arch, means for withdrawing said support yieldingly from the arch, means for forcing it toward the arch positively, and means for limiting the motion of said support in both directions.

22. The combination of an arch, a shaft therein, finishing means operable by said shaft, a support for the plate in the arch, means for withdrawing said support from the arch yieldingly, and means operable by said shaft for forcing said support toward the arch positively.

23. In a plate finishing machine, the combination of an arch for receiving plates, a shaft therein, a shaver on said shaft, an end finishing cutter on the shaft, a stop for the plates located in the path of said end finishing cutter, means for clamping a plate in the arch, and means for moving the stop out of the path of the end finishing cutter and returning it thereto.

24. In a plate finishing machine, the combination of a feed device along which the plate travels, an end finishing cutter, a stop for the plate adapted to engage the surface to be finished by said cutter and arrest the plate, and means for moving the stop out of the path of said cutter.

25. In a plate finishing machine, the combination of a feed device along which the plate travels, an end finishing cutter, a stop for the plate adapted to engage the surface to be finished by said cutter and arrest the plate, means for moving the stop out of the path of said cutter, and means for holding the plate in position while the stop is out of contact therewith.

26. In a plate finishing machine, the combination of an arch for receiving the plate while being finished, means for preliminarily cooling the plate while in said arch without direct contact with the cooling fluid, means for finishing the plates, a cooling arch having means for carrying forward the cooling of the plates, and means for directing the plate from the first mentioned arch to the cooling arch.

27. In a plate finishing machine, the combination of an arch for receiving the plates while being finished, means for preliminarily cooling the plates in the arch, means for finishing the plates, and means for carrying forward the cooling of the plates after they are discharged from the arch.

28. In a plate finishing machine, the combination of an arch for receiving plates while being finished, said arch having means for preliminarily cooling the plates, means for finishing the plates, and a cooling arch into which the plates are discharged from the first mentioned arch, said cooling arch having means for directing a cooling fluid against the plates, and carrying forward the cooling operation.

29. In a plate finishing and cooling machine, the combination of a finishing device, means for preliminarily cooling plates while being finished, a feeding device in position to deliver plates to the finishing device, a splash plate, and means beyond the splash plate for receiving the plates to be finished and carrying forward the cooling operation.

30. In a machine for finishing and cooling cast plates, the combination of a cooling device for receiving and cooling the plates, a finishing device adjacent thereto, a movable stop, located adjacent to the discharge end of the cooling device, and means connected with the finishing device for operating said stop.

31. In a machine for finishing and cooling cast plates, the combination of a gravity feeding device, a finishing device located adjacent thereto, a cooling device located adjacent to the gravity feeding device at a point below the finishing device, a movable stop at the discharge end of the cooling device, and means connected with the finishing device for operating said stop.

32. In a machine for preparing stereotype plates for printing, the combination of means for shaving the plates, means for preliminarily cooling the plates while being shaved, means for completing the cooling of the plates by the application of water directly to the surfaces thereof, and means for removing the water from the plates.

33. In a machine for preparing stereotype plates for printing, the combination of means for trimming the edges of the plates, means for shaving the plates, means for preliminarily cooling the plates while being shaved, means for completing the cooling of the plates by the application of water directly to the surfaces thereof, means for removing the water from the plates, and a gravity feed device for transferring the plates automatically through said several devices in the order named.

34. The combination with a stereotype plate finishing device comprising a shaver, of means connected therewith for wetting the plates and means for thereafter wiping the plates.

35. In a stereotype plate finishing mechanism, the combination of means for shaving plates, means for cooling the plates, means for drying the plates, and means for carrying the plates from the shaving means to the cooling means, and from the cooling means to the drying means.

36. In a stereotype plate finishing mechanism, the combination of means for shaving plates, means for cooling the plates, means for drying the plates, and means for carrying the plates from the shaving means to the cooling means, and from the cooling means to the drying means, and means for delivering the plates after drying.

37. In a plate finishing machine, the combination of an arch for receiving plates, supports on the sides of the arch, rollers carried by said supports for supporting the edges of the plates, means for moving said supports toward the arch, and means for withdrawing them therefrom, said last named means comprising a spring.

38. In a machine for finishing cast plates, the combination of means for supporting the lower edges of the plates and feeding them endwise, a shaver, and means adjacent the end of the shaver and in operative relation therewith for stopping the plates.

In testimony whereof I have hereunto set my hand, in the presence of two subscribing witnesses.

H. A. WISE WOOD.

Witnesses:
MARY E. McCADDEN,
HARRY R. LENNOX.